Patented Aug. 11, 1931

1,818,547

UNITED STATES PATENT OFFICE

HANS FINKELSTEIN, OF UERDINGEN, NIEDERRHEIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

LACQUER FOR APPLICATION BY BRUSHING

No Drawing. Application filed July 13, 1928, Serial No. 292,599, and in Germany December 22, 1924.

The present invention relates to new and improved lacquers for appplication by brushing, which contain collodion cotton. The manufacture of such lacquers has hitherto afforded great difficulties since the usual solvents for such lacquers such as butyl acetate, amyl acetate, cyclohexanone and the like, are either too readily volatile or objectionable in view of their strong and irritating smell. Moreover the said solvents possess the highly objectionable property, when applied to dry cellulose nitrate coatings, to swell or dissolve the same to a considerable extent, whereby the suitability of the lacquers for brushing, their capability of forming smooth surfaces and the time required for drying are unfavourably influenced.

By my present invention I claim to have successfully overcome the said difficulties and to be able to produce good lacquers for application by brushing.

I have found that good lacquers for application by brushing are obtained when dissolving from 8 to 25 parts of collodion cotton which forms solutions of low viscosity and of which at least 15 per cent are soluble in 96 per cent ethyl alcohol, in from 25 to 60 parts of an ether mixture, the composition of which will be explained hereinafter, and from 7 to 10 parts of a solvent containing a substantial proportion of ethyl alcohol. The aforesaid ether mixture consists of from 80 to 20 parts of ethylene glycol monomethyl ether and from 20 to 80 parts of a solvent which corresponds to the general formula $HO-C_nH_{2n}-OR$ (in which R indicates an alkyl group with from 1 to 4 carbon atoms and $n$ is 2, 3 or 4 and which contains at least 5 carbon atoms in its molecule). The solvent containing a substantial proportion of ethyl alcohol may consist of ethyl alcohol alone, but may also contain methanol, isopropyl alcohol, butanol or one of the usual solvents or diluents or several of these substances. Generally speaking it it should contain at least 30% of ethyl alcohol.

The amount of colodion cotton to be employed depends on the viscosity, that means greater amounts of a collodion cotton furnishing solutions of low viscosity can be incorporated with a lacquer capable of being applied by brushing than of a collodion cotton furnishing solutions of greater viscosity. Having regard to this, lacquers for application by brushing, which fulfil the aforementioned requirements, can be produced from any kind of collodion cotton.

I may also incorporate with my improved lacquers many natural and artificial resins compatible with collodion cotton, for example artificial resins obtained by polymerization of vinyl esters preferably in an amount of from 10 to 60 per cent of the dry weight of the collodion cotton employed. It is most advantageous to employ artificial resins obtained from cyclic ketones such as cyclohezanone with or without the aid of phenols and aldehydes. Also plasticizers and small quantities of drying or non-drying oils may be added to the solutions, and the lacquers may be colored by the addition of suitable coloring matters so as to produce transparent or covering lacquers.

It will be obvious from the foregoing general explanations that it is possible according to my present invention to vary the properties of the lacquers within very wide limits and to meet all requirements of practice, for example as regards the hardness, suppleness, adhesiveness, and lustre of the coatings, the time required for drying and the like.

The following example will further illustrate the nature of my invention which, however, is not limited to this example. The parts are by weight.

Example 16 parts of a collodion cotton, about 90 per cent of which are soluble in 96 per cent ethyl alcohol, 8 parts of an artificial resin prepared from cyclohexanone, formaldehyde and phenol, and 6 parts of dibutyl phthalate are dissolved in a mixture of 25 parts of ethylene glycol monemethyl ether and 15 parts of ethylene glycol monobutyl ether, whereupon a mixture of 30 parts of ethyl alcohol, 10 parts of isopropyl alcohol and 4 parts of methanol is added. The resulting lacquer is readily applicable by brushing to any kind of support, for example coatings of oil paint, and furnishes coatings of great hardness and stability.

What I claim is:

1. A lacquer for application by brushing, comprising from 8 to 25 parts of collodion cotton which forms solutions of low viscosity and of which at least 15 per cent are soluble in 96 per cent ethyl alcohol, an artificial cyclic ketone resin, a mixture of from 80 to 20 parts of ethylene glycol monomethyl ether with from 20 to 80 parts of a solvent which corresponds to the general formula $HO-C_nH_{2n}-OR$ (in which R indicates an alkyl group with from 1 to 4 carbon atoms and $n$ is 2, 3 or 4 and which contains at least 5 carbon atoms in its molecule and from 67 to 10 parts of a solvent, containing a substantial proportion of ethyl alcohol.

2. A lacquer for application by brushing, comprising from 8 to 25 parts of collodion cotton which forms solutions of low viscosity and of which at least 15 per cent are soluble in 96 per cent ethyl alcohol, an artificial resin prepared from cyclohexanone, formaldehyde and phenol, a softener, a mixture of from 80 to 20 parts of ethylene glycol monomethyl ether with from 20 to 80 parts of a solvent which corresponds to the general formula $HO-C_nH_{2n}-OR$ (in which R indicates an alkyl group with from 1 to 4 carbon atoms and $n$ is 2, 3 or 4 and which contains at least 5 carbon atoms in its molecule), and from 67 to 10 parts of a solvent containing a substantial proportion of ethyl alcohol.

3. A lacquer for application by brushing, comprising 16 parts of a collodion cotton, about 90 per cent of which are soluble in 96 per cent ethyl alcohol, 8 parts of an artificial resin prepared from cyclohexanone, formaldehyde and phenol, 6 parts of dibutyl phthalate, a mixture of 25 parts of ethylene glycol monomethyl ether with 15 parts of ethylene glycol monobutylether, and a mixture of 30 parts of ethyl alcohol, 10 parts of isopropyl alcohol and 4 parts of methanol.

4. A lacquer for application by brushing, comprising from 8 to 25 parts of collodion cotton which forms solutions of low viscosity and of which at least 15 per cent are soluble in 96 per cent ethyl alcohol, an artificial resin prepared from cyclohexanone, formaldehyde and phenol, a softener, a mixture of from 80 to 20 parts of ethylene glycol monomethyl ether with from 20 to 80 parts of ethylene glycol mono-butyl ether, and from 67 to 10 parts of a solvent containing a substantial proportion of ethyl alcohol.

In testimony whereof I have hereunto set my hand.

HANS FINKELSTEIN.